Jan. 19, 1937. E. H. ELLISON Re. 20,249
CASEMENT WINDOW FASTENER
Original Filed Nov. 9, 1929
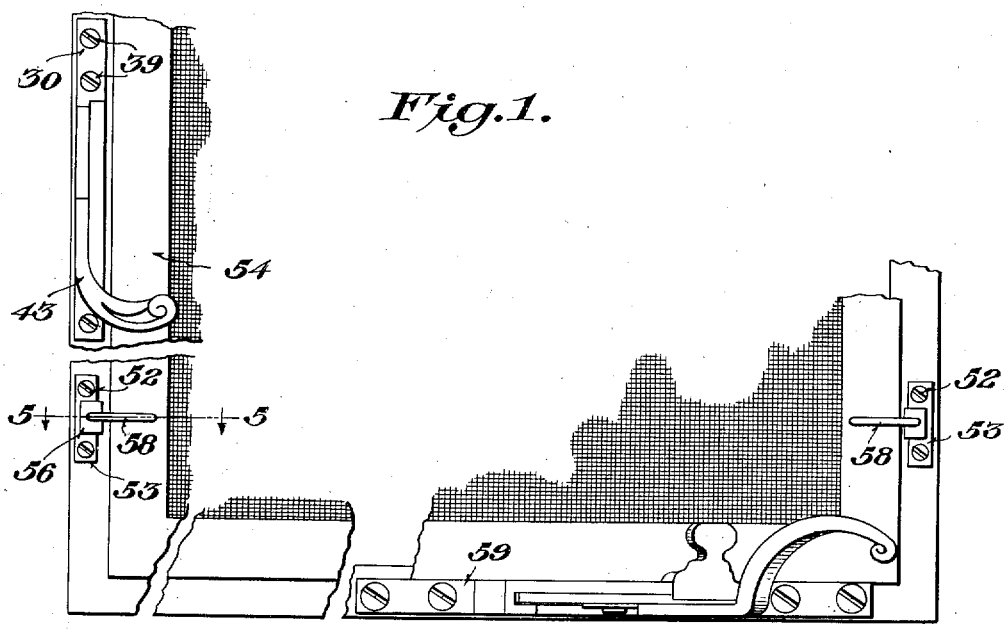
Fig. 1.
Fig. 3.
Fig. 2.
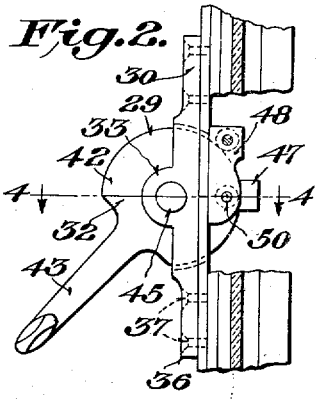
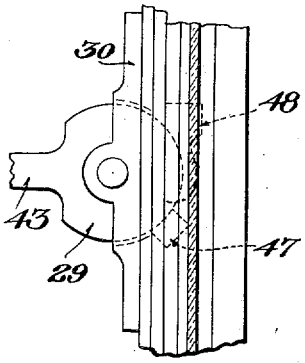
Fig. 4.
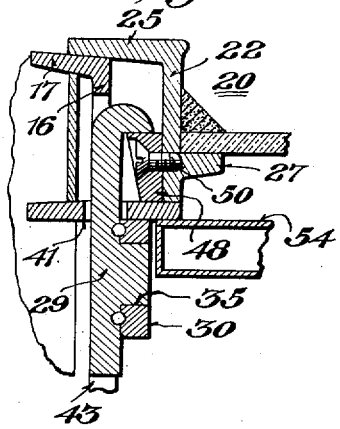
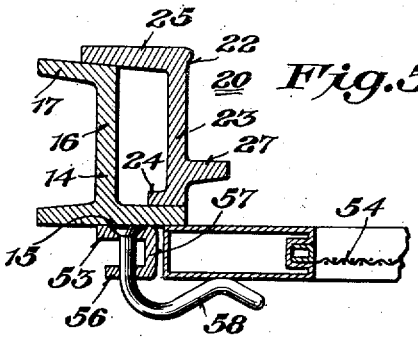
Fig. 5.
Inventor
EDWARD H. ELLISON, DECEASED, BY HOPE'S WINDOWS, INC., ASSIGNEE, BY FRANK GARRATT, PRESIDENT,
By Richmond S. Hayes
Attorney Reissued Jan. 19, 1937 Re. 20,249

UNITED STATES PATENT OFFICE 20,249

CASEMENT WINDOW FASTENER

Edward H. Ellison, deceased, late of Jamestown, N. Y., by Hope's Windows Inc., assignee, Jamestown, N. Y., a corporation Original application November 9, 1929, Serial No. 405,937. Divided and application October 22, 1930, Serial No. 490,449. Original No. 1,988,306, dated January 15, 1935. Application for reissue May 13, 1936, Serial No. 80,587

6 Claims. (Cl. 292—241)

This invention relates to an improvement in fastening means for casement windows and is a division of copending application Serial No. 405,937, filed November 9, 1929.

The preferred embodiment of this invention discloses a casement window in which is mounted a fastening device, the location of which being such as to permit free and independent mounting of a casement screen.

Practically all casement windows are adapted to be provided with screens. Since windows of this type normally swing outwardly, it is necessary that the screen be located on the inside of the casement. This practice involves providing a casement latch and operator in a manner such as to permit free installation or removal of a screen. The following specification discloses a casement latch mounted on the frame and operably connected with the sash. The location of the latch is such that a screen may be installed directly against the casement frame, independently of and with total disregard for said latch.

The principal object of this invention therefore lies in the provision of a casement window latch which permits independent installation of a standard screen.

Another object of the invention lies in the provision of a latch adapted to reach out and draw the sash into close engagement with the frame.

A further object of the invention is to provide a novel latching means which operates through the window frame, and in all positions thereof has its walls in close relation to the walls of an opening in which the latching means operates.

Further objects of the invention may be more clearly understood from a consideration of the following specification which is taken in conjunction with the accompanying drawing, and in which Fig. 1 is a fragmentary front elevation of a casement window, showing the location of a casement latch relative to a removable screen;

Fig. 2 is a side elevation of the casement latch in engagement with the sash, parts of both frame and sash being broken away to clarify the showing;

Fig. 3 is a side elevation showing the casement latch in disengaged position;

Fig. 4 is a sectional view taken substantially on the line 4—4 of Figure 2 and shows the structural details of the casement latch; and Fig. 5 is a horizontal view taken on the line 5—5 of Figure 1 and shows the method of removably securing the screen against the casement.

Reference is now had to the drawing, wherein is shown a casement window comprising a casement frame 14 which is formed to provide an inner vertical face 15, web 16 and outer flange 17. A recess, created by the wall 15 and flange 17, constitutes the means by which said frame is cemented in the opening provided therefore.

The sash 20, mounted in the frame 14, has stiles 22 which are formed with a web portion 23 which terminates in inner and outer flanges 24 and 25. The usual flange 27 projects inwardly from the web 23, forming a shoulder against which a pane of glass is mounted.

When the sash 20 is moved into engagement with the casement frame 14, a latch member 29 is manipulated to prevent inadvertent or undesired opening of said sash from the exterior thereof. The latch member 29, mounted on the frame stile is comprised of a fixed supporting element 30 and movable element 32. The fixed element is formed with an outwardly projecting central flange 33, through which an opening 35 is drilled. Continuing above and below the central flange 33 are angularly disposed flanges 36, through which openings 37 are drilled. The fixed element 30 is mounted on the frame stile by inserting screws 39 in the openings 37, engaging said screws with openings provided therefore in the stile. A slotted opening 41 is formed in the stile and, when the element 30 is mounted, said opening lies between the flanges 36 and adjacent the central flange 33. The movable element 32 comprises a substantially circular plate 42 and an integral actuating handle 43. The plate 42 is formed with a center pin 45 which engages the opening 35 in the flange 33 of the fixed element 30 and is adapted to pivotally support said plate. The outer end of the pin 45 is headed over to prevent dislodgment of the movable element. Formed in the circumferential edge of and at right angles to the plate 42 is a lug 47, the thickness of which is slightly less than that of the opening 41 in the stile in which it is mounted. The purpose of this is to permit inserting the lug 47 through the opening 41. It is pointed out that the plate 42 projects into the opening 41 to a point where the circumferential edge thereof closely approaches the walls of said opening and, since said plate is circular, it may be rotated in said opening without any variation in clearance. A bracket 48 is secured to the web 23 of the sash stile by screws 50. This bracket has a cam face curved at the upper end to coincide with the arc of travel of the lug 47 and at the lower end to recede from said arc.

The lug 47 is adapted when the handle 43 moves downwardly, to travel upwardly in an arc about the pivot pin 45 and engage the edge of the bracket 48. Since the plate 42, to which the lug 47 is attached, is fixed to the frame stile, further downward movement of the handle 43 causes the bracket 48 to move inwardly toward the frame, carrying with it the sash 20. It will thus be understood that the sash need not be closely engaged with the frame when operating the latch member by reason of the fact that the lug 47, in acting upon the cam-like bracket 48, reaches out and draws the sash into close engagement with the frame. Much difficulty has been encountered in providing a casement latch of sufficient strength to draw a sash into uniformly close engagement with a frame. The structure above described, however, causes the uniform engagement of a casement sash with the frame even though said sash may have become slightly sprung for one reason or another.

Secured to the inner face of the stile of the casement frame, and by means of screws 52, are plates 53. These plates are for the purpose of mounting a screen 54 of standard structure. It is contemplated to mount one or more of the plates 53 on the stiles of the frame by which to removably support the screen. Each plate is formed with a center reverse flange element 56, the web 57 of which defines the location of the screen stiles. The element 56 and the body of the plate are drilled to receive a spring hook 58. The end of the hook, lying within the plate, is headed over to prevent removal therefrom, thus permitting a pivotal relative movement between the plate and hook, whereby to rotate said hook to engage or release the screen 54.

To mount the screen against the casement frame, the hooks 58 are turned to point either upwardly or downwardly. The lower rail of the screen rests upon a sash adjuster support 59 with the screen stiles abutting the web 57 of each of the plates 53. After mounting the screen, the hooks 58 are moved to engage the screen stiles.

Attention is directed to the fact that the screen frame, at all points, slightly overlaps the inner edge of the casement frame and is caused to closely engage said frame under pressure of the spring hooks 58. It will be further noted that the screen 54 is mounted above the sash adjuster support 59, and to one side of the latch 29, and may therefore be inserted or removed with total disregard for either adjuster or latch. It thus follows that a screen of standard size and construction may be mounted on a casement window having latching means as shown and described. The structure of the latch 29 is such that the parts thereof, when mounted on the frame stile, take up but a small part of the stile depth. The reason for this is apparent, since approximately three-eighths of an inch of the stile is required to be embedded or anchored to the walls forming the casement opening and approximately one-fourth of an inch is required by the overlapping screen 54. The space remaining between the edge of the screen and the building wall, and within which the latch 29 must be mounted, is not over one-half inch. It is well known that, while a casement sash is readily adjustable, it can not be readily drawn into engagement with a frame without the aid of a strong latch mechanism, by reason of the fact that the sash may be slightly sprung or dirt may have gathered between the sash and frame which would tend to prevent the ready engagement of these units. Through the use of a vertically reciprocating latch member, applicant is enabled to keep his structure well within the space limit and at the same time provide a latch member which is of sufficient strength to at all times engage and draw the sash into a sealing engagement with the frame.

The plate 42 as above described being of substantially circular or disc-like form and by virtue of its circumferential edge lying close to the adjacent walls resultant from the slot or opening 41, prevents occurrence of a gap or opening in any rotative position of said plate.

The supporting element 30 also constitutes a bracket on which the disc-like element 42 is pivoted.

While but one modification of this invention has been shown and described, applicant does not intend to be limited thereto, since it is obvious to those skilled in the art that certain structural changes may be made without departing from the spirit and scope of the invention as set forth in the hereunto annexed claims.

What is claimed is:

1. A latch for a casement window embodying a frame and a window pivotally associated with said frame, said latch comprising a stationary element secured to said frame, a rotatable plate mounted on said element and projecting through an opening in said frame, a cam on said window, a lug on said plate engageable with said cam, said plate being rotatable in a plane perpendicular to a plane determined by the inner face of said frame, whereby to move said window in a direction substantially radially of the axis of rotation of said plate, when said window is in a position to permit engagement of said lug with said cam.

2. A latch for use with a casement window of the type having a frame partially embedded in a building wall, and having a window pivotally associated with said frame, said latch comprising a stationary element adapted to be secured to the exposed portion of said frame, a rotatable plate supported on said element and projecting through an opening in said frame, a cam on said window, a lug on the circumferential edge of said plate engageable with said cam, and a handle on said plate, said plate and said handle being rotatable in a plane perpendicular to a plane determined by the inner face of said frame.

3. For a casement window construction including a frame and sash, said frame having an opening, a supporting bracket secured to said frame adjacent said opening, and said sash having a contact means thereon for disposition in proximity to said bracket when said sash approaches closed position, a latch comprising a member rotatably carried at an angle to said frame on said bracket, a disk-like portion on said member having its peripheral edge lying closely adjacent the walls of the frame opening in all rotative positions of said member, and means associated with said member coacting with said contact means imposing a camming action whereby to effect drawing in of said sash to final closed position.

4. For a casement window construction including a frame and sash, said frame having an opening, a supporting bracket having an opening, secured to said frame with the opening thereof in register with the frame opening, and said sash having contact means thereon for disposition in proximity to said bracket when said sash approaches closed position, a latch comprising a member rotatably carred at an angle to said frame on said bracket, a disk-like portion on said member having its peripheral edge lying closely adjacent the walls of said bracket opening in all rotative positions of said member and projecting through said frame opening, and means associated with said member coacting with said contact means imposing a camming action whereby to effect drawing in of said sash to final closed position.

5. For a casement window construction including a frame and sash, said frame having an opening, a supporting bracket, having an opening, secured to said frame with the opening thereof coinciding with the frame opening, and said sash having a contact means thereon for disposition in proximity to said bracket when said sash approaches closed position, a latch comprising a member rotatably carried at right angles to said frame by said bracket, a disk-like portion on said member having its peripheral edge lying closely adjacent the walls of said frame and said bracket openings in all rotative positions of said member, and means on said member coacting with said contact means imposing a camming action whereby to effect drawing in of said sash to final closed position.

6. A latch for a casement window embodying a frame partially embedded in a building wall, and a window pivotally associated with said frame, said latch comprising a stationary element secured to the exposed portion of said frame adjacent the building wall, a movable plate supported on said element and projecting through an opening in said frame, contact means on said window, a lug on that porton of said plate lying within the rectangular space defined by said window and said frame, said lug, when said plate is manipulated, being constrained to move outwardly to engage said contact means and again inwardly to draw said window into abutment with said frame.

EDWARD H. ELLISON, Deceased,
By HOPE'S WINDOWS, INC., Assignee,
By FRANK GARRATT,
*President.*